(12) United States Patent
Lee

(10) Patent No.: US 8,924,856 B2
(45) Date of Patent: Dec. 30, 2014

(54) METHOD OF AND APPARATUS FOR PROVIDING A SLIDE SHOW, AND COMPUTER READABLE STORAGE MEDIUM HAVING RECORDED THEREON A COMPUTER PROGRAM FOR PROVIDING A SLIDE SHOW

(75) Inventor: Jae-myung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 608 days.

(21) Appl. No.: 12/683,518

(22) Filed: Jan. 7, 2010

(65) Prior Publication Data

US 2010/0185950 A1 Jul. 22, 2010

(30) Foreign Application Priority Data

Jan. 21, 2009 (KR) .................. 10-2009-0005154

(51) Int. Cl.
*G06F 3/00* (2006.01)
*H04N 1/21* (2006.01)
*H04N 1/00* (2006.01)
*G06F 3/048* (2013.01)
*H04N 1/32* (2006.01)
*H04N 101/00* (2006.01)

(52) U.S. Cl.
CPC ......... *H04N 1/2112* (2013.01); *H04N 1/00458* (2013.01); *H04N 1/215* (2013.01); *H04N 1/32128* (2013.01); *H04N 2101/00* (2013.01); *H04N 2201/0084* (2013.01); *H04N 2201/3223* (2013.01); *H04N 2201/325* (2013.01)
USPC ........... 715/730; 715/728; 715/828; 715/854; 386/248

(58) Field of Classification Search
USPC .................. 715/730, 728, 828, 854; 386/248
See application file for complete search history.

(56) References Cited

U.S. PATENT DOCUMENTS

| | | | | |
|---|---|---|---|---|
| 5,719,987 A * | 2/1998 | Kawamura et al. | ........... | 386/225 |
| 6,008,807 A * | 12/1999 | Bretschneider et al. | ...... | 715/732 |
| 6,717,591 B1 * | 4/2004 | Fiveash et al. | ................. | 715/732 |
| 6,738,075 B1 * | 5/2004 | Torres et al. | .................. | 715/723 |
| 7,193,646 B1 * | 3/2007 | Shioji | ........................ | 348/220.1 |
| 7,412,155 B2 * | 8/2008 | Kasai | ............................ | 386/248 |
| 7,469,054 B2 * | 12/2008 | Aratani et al. | ................ | 382/118 |

(Continued)

FOREIGN PATENT DOCUMENTS

| | | |
|---|---|---|
| CN | 101115113 A | 1/2008 |
| CN | 101322396 A | 12/2008 |

OTHER PUBLICATIONS

Office Action established for CN 201010004770.5 (Jul. 3, 2013).
Office Action issued for CN 201010004770.5 (Mar. 17, 2014).

(Continued)

*Primary Examiner* — Steven B Theriault
(74) *Attorney, Agent, or Firm* — Drinker Biddle & Reath LLP

(57) ABSTRACT

Provided is a method of providing a slide show. The method includes determining whether a first image to be displayed is an image photographed in a continuous photographing mode, when the first image is an image photographed in the continuous photographing mode, displaying the first image for a first time interval, and when the first image is not an image photographed in the continuous photographing mode, displaying the first image for a second time interval, wherein the first time interval and the second time interval are different from each other. The first time interval may be shorter than the second time interval.

10 Claims, 8 Drawing Sheets

(56) References Cited

U.S. PATENT DOCUMENTS

| | | | |
|---|---|---|---|
| 7,542,661 B2 * | 6/2009 | Terada | 386/248 |
| 7,587,671 B2 * | 9/2009 | Saft et al. | 715/253 |
| 7,656,399 B2 * | 2/2010 | Ono | 345/204 |
| 7,675,530 B2 * | 3/2010 | Koresawa et al. | 345/690 |
| 7,683,942 B2 * | 3/2010 | Tsujii et al. | 348/231.2 |
| 7,683,943 B2 * | 3/2010 | Ogawa et al. | 348/231.6 |
| 7,743,331 B1 * | 6/2010 | Fleischer et al. | 715/731 |
| 7,787,026 B1 * | 8/2010 | Flory et al. | 348/231.99 |
| 7,945,857 B2 * | 5/2011 | Deutscher et al. | 715/725 |
| 8,102,457 B1 * | 1/2012 | Anderson | 348/333.01 |
| 8,127,232 B2 * | 2/2012 | Pavley et al. | 715/747 |
| 8,497,920 B2 * | 7/2013 | Levoy et al. | 348/222.1 |
| 2001/0012065 A1 * | 8/2001 | Ejima et al. | 348/232 |
| 2001/0016113 A1 * | 8/2001 | Ejima et al. | 386/96 |
| 2002/0024608 A1 * | 2/2002 | Ejima et al. | 348/333.05 |
| 2002/0054157 A1 * | 5/2002 | Hayashi et al. | 345/838 |
| 2002/0054168 A1 * | 5/2002 | Ohmura | 345/854 |
| 2003/0147640 A1 * | 8/2003 | Voss et al. | 396/310 |
| 2003/0169278 A1 * | 9/2003 | Obrador | 345/629 |
| 2003/0184658 A1 * | 10/2003 | Fredlund et al. | 348/220.1 |
| 2003/0222890 A1 * | 12/2003 | Salesin et al. | 345/629 |
| 2003/0222998 A1 * | 12/2003 | Yamauchi et al. | 348/262 |
| 2004/0022522 A1 * | 2/2004 | Terada | 386/69 |
| 2004/0114904 A1 * | 6/2004 | Sun et al. | 386/46 |
| 2004/0130635 A1 * | 7/2004 | Kasai | 348/231.99 |
| 2004/0150724 A1 * | 8/2004 | Nozaki et al. | 348/211.4 |
| 2004/0169760 A1 * | 9/2004 | Furukawa | 348/333.12 |
| 2004/0184778 A1 * | 9/2004 | Jung et al. | 386/95 |
| 2004/0201610 A1 * | 10/2004 | Rosen et al. | 345/731 |
| 2005/0069295 A1 * | 3/2005 | Kim et al. | 386/95 |
| 2005/0071762 A1 * | 3/2005 | Kim et al. | 715/719 |
| 2005/0140808 A1 * | 6/2005 | Kasai | 348/333.01 |
| 2005/0180728 A1 * | 8/2005 | Ichioka et al. | 386/46 |
| 2005/0212915 A1 * | 9/2005 | Karasaki et al. | 348/207.2 |
| 2005/0212943 A1 * | 9/2005 | Karasaki et al. | 348/333.02 |
| 2005/0259163 A1 * | 11/2005 | Tsujii et al. | 348/231.2 |
| 2005/0278634 A1 * | 12/2005 | Chen et al. | 715/723 |
| 2006/0050086 A1 * | 3/2006 | Ono | 345/629 |
| 2007/0101270 A1 * | 5/2007 | Chianglin | 715/730 |
| 2007/0104461 A1 * | 5/2007 | Cho | 386/96 |
| 2007/0112852 A1 * | 5/2007 | Sorvari et al. | 707/104.1 |
| 2007/0147787 A1 * | 6/2007 | Ogawa et al. | 386/107 |
| 2007/0192741 A1 * | 8/2007 | Yoritate et al. | 715/828 |
| 2007/0201839 A1 * | 8/2007 | Murakami | 386/125 |
| 2007/0274393 A1 * | 11/2007 | Toma et al. | 375/240.23 |
| 2007/0285524 A1 * | 12/2007 | Murata | 348/220.1 |
| 2008/0024632 A1 | 1/2008 | Otsuka | |
| 2008/0148153 A1 * | 6/2008 | Lee et al. | 715/730 |
| 2009/0044151 A1 * | 2/2009 | Ichii et al. | 715/854 |
| 2009/0051700 A1 * | 2/2009 | Araki et al. | 345/619 |
| 2009/0067815 A1 * | 3/2009 | Tsutsui | 386/117 |
| 2009/0097828 A1 * | 4/2009 | Ishii | 386/126 |
| 2009/0113307 A1 * | 4/2009 | MacKenzie | 715/732 |
| 2009/0119596 A1 * | 5/2009 | Iwahara et al. | 715/730 |
| 2009/0154833 A1 * | 6/2009 | Sakaue et al. | 382/282 |
| 2009/0167873 A1 * | 7/2009 | Sakaue et al. | 348/207.2 |
| 2009/0202222 A1 * | 8/2009 | Kageyama et al. | 386/68 |
| 2009/0208119 A1 * | 8/2009 | Lee et al. | 382/232 |
| 2009/0295942 A1 * | 12/2009 | Barnett | 348/231.2 |
| 2010/0027959 A1 * | 2/2010 | Obama | 386/52 |
| 2010/0079610 A1 * | 4/2010 | Suehiro | 348/222.1 |
| 2010/0094441 A1 * | 4/2010 | Mochizuki et al. | 700/94 |
| 2010/0134657 A1 * | 6/2010 | Tsujii et al. | 348/231.2 |
| 2010/0318941 A1 * | 12/2010 | Yamada et al. | 715/835 |
| 2011/0122275 A1 * | 5/2011 | Kawai et al. | 348/231.2 |
| 2011/0126156 A1 * | 5/2011 | Krishnaraj et al. | 715/828 |
| 2011/0145709 A1 * | 6/2011 | Yoo et al. | 715/730 |
| 2011/0268419 A1 * | 11/2011 | Hirose et al. | 386/224 |

OTHER PUBLICATIONS

Office Action issued for CN 201010004770.5 (Oct. 8, 2014).

\* cited by examiner

METHOD OF AND APPARATUS FOR PROVIDING A SLIDE SHOW, AND COMPUTER READABLE STORAGE MEDIUM HAVING RECORDED THEREON A COMPUTER PROGRAM FOR PROVIDING A SLIDE SHOW

CROSS-REFERENCE TO RELATED PATENT APPLICATION

This application claims the benefit of Korean Patent Application No. 10-2009-0005154, filed on Jan. 21, 2009, in the Korean Intellectual Property Office, the disclosure of which is incorporated herein in its entirety by reference.

BACKGROUND

The present invention relates to a method and apparatus for providing a slide show displaying a plurality of images, and a computer readable storage medium having recorded thereon a computer program for providing the slide show.

Many electronic apparatuses having an image displaying function also have a slide show function. The slide show function sequentially displays a plurality of slide show objects, such as images or slides. The slide show function displays a following slide show object according to an input from a user or automatically displays the following slide show object after a predetermined time. Since the slide show function requires relatively little input from the user compared to when the user generally browses image files, the user is able to conveniently browse many images by using the slide show function.

Also, many digital photographing apparatuses also have a continuous photographing mode. In the continuous photographing mode, digital photographing apparatuses continuously photograph a subject a predetermined number of times at uniform time intervals. By using the continuous photographing mode, the user is able to vividly photograph the subject in motion.

SUMMARY

The present invention provides a vivid slide show by differentiating a display time interval of a plurality of images photographed in a continuous photographing mode from images photographed in a general photographing mode, when the plurality of images photographed in the continuous photographing mode is displayed in the slide show.

According to an aspect of the present invention, there is provided a method of providing a slide show for displaying a plurality of images, the method including: determining whether a first image to be displayed is an image photographed in a continuous photographing mode; displaying the first image for a first time interval, when the first image is an image photographed in the continuous photographing mode; and displaying the first image for a second time interval, when the first image is not an image photographed in the continuous photographing mode, wherein the first time interval and the second time interval are different from each other.

When the first image is an image photographed in the continuous photographing mode, the displaying may include: determining whether images to be displayed after the first image are images photographed in the continuous photographing mode until an image that is not photographed in the continuous photographing mode is detected, and counting a number of continuous images N by counting the number of images photographed in the continuous photographing mode; and displaying the first image through an (N−1)th image for the first time interval, and displaying an Nth image for the second time interval.

The method may further include: providing a user interface capable of receiving a user input regarding the first and second time intervals; and determining the first and second time intervals according to a user input received from the user interface.

According to another aspect of the present invention, there is provided an apparatus for providing a slide show, the apparatus including: an image storage unit for storing a plurality of images; a display unit for displaying an image; a continuous photographing image detector for determining whether a first image to be displayed is an image photographed in a continuous photographing mode; and a slide show provider for controlling the display unit to display the first image for a first time interval when the first image is an image photographed in the continuous photographing mode, and to display the first image for a second time interval when the first image is not an image photographed in the continuous photographing mode, wherein the first time interval and the second time interval are different from each other.

The continuous photographing image detector may determine whether images to be displayed after the first image are images photographed in the continuous photographing mode until an image that is not photographed in the continuous photographing mode is detected, and count a number of continuous images N by counting the number of images photographed in the continuous photographing mode, and the slide show provider may control the display unit to display the first image through an (N−1)th image for the first time interval, and display an Nth image for the second time interval, when the first image is an image photographed in the continuous photographing mode.

The apparatus may further include a user interface capable of receiving a user input regarding the first and second time interval, wherein the slide show provider may determine the first and second time intervals according to a user input received from the user interface.

The apparatus may be a digital photographing apparatus.

According to another aspect of the present invention, there is provided a computer readable storage medium having recorded thereon a computer program executable on a processor for providing a slide show displaying a plurality of images, the computer program including: a code portion programmed to determine whether a first image to be displayed is an image photographed in a continuous photographing mode; a code portion programmed to display the first image for a first time interval when the first image is an image photographed in the continuous photographing mode; and a code portion programmed to display the first image for a second time interval when the first image is not an image photographed in the continuous photographing mode, wherein the first time interval and the second time interval are different from each other.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, the present invention will be described more fully with reference to the accompanying drawings, in which exemplary embodiments of the invention are shown. Following descriptions and attached drawings are for understanding operations according to the present invention, and descriptions that may be easily realized by one of ordinary skill in the art may be omitted.

The detailed description and the drawings are not provided to limit the scope of the invention, and the scope of the invention shall be defined by claims. Unless defined otherwise, technical and scientific terms used herein have the same meaning as is commonly understood by one of skill in the art to which this invention belongs.

The exemplary embodiments of the present invention will now be described with reference to the attached drawings.

Figure 1:
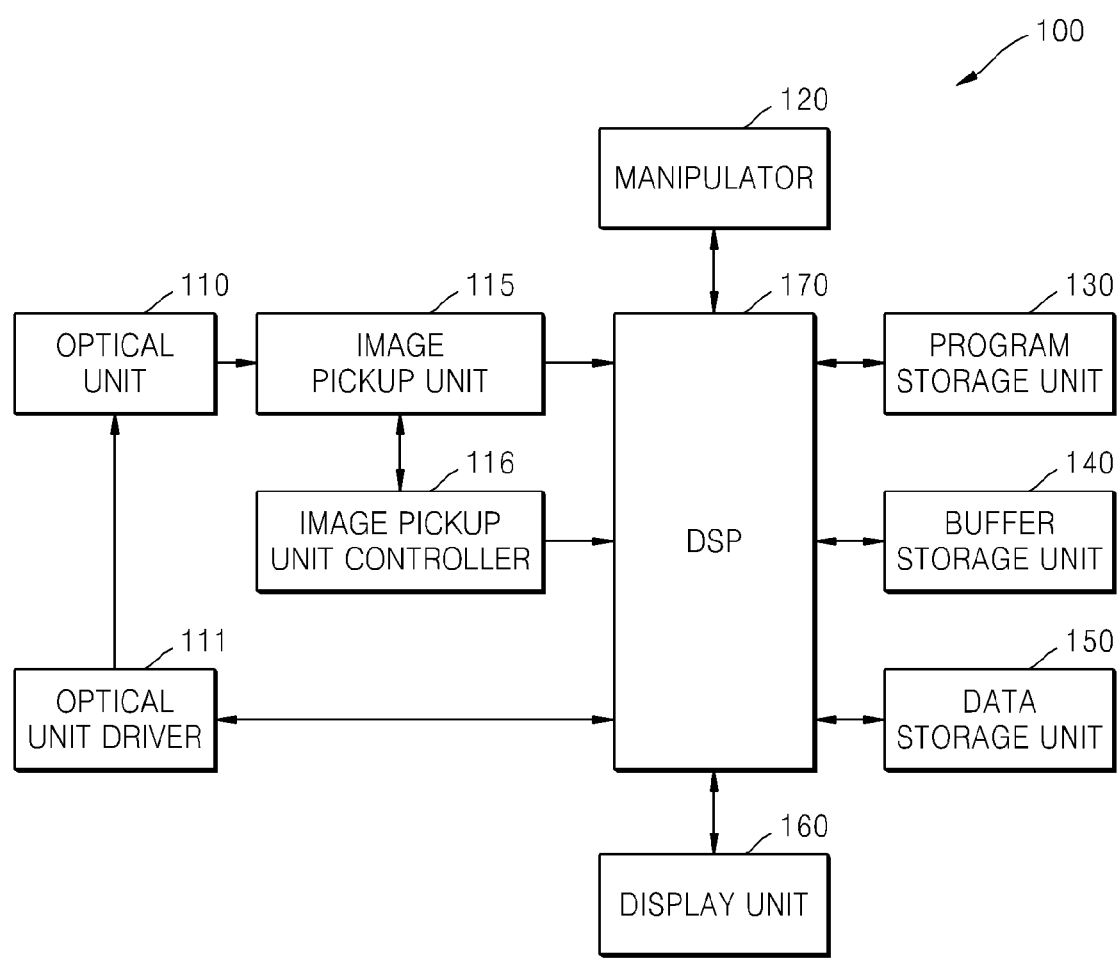
FIG. 1 is a block diagram illustrating an exemplary structure of an electronic apparatus that may use a method of and apparatus for providing a slide show and a computer readable storage medium having recorded thereon a program for providing a slide show according to an embodiment of the present invention.

FIG. 1 is a block diagram illustrating an exemplary structure of an electronic apparatus that may use a method of and apparatus for providing a slide show and a computer readable storage medium having recorded thereon a program for providing a slide show according to an embodiment of the present invention.

The present invention may be used in any electronic apparatuses capable of displaying an image. For example, the present invention may be used in a digital photographing apparatus 100 to display image files photographed by the digital photographing apparatus 100 by using a slide show function. An exemplary structure of the digital photographing apparatus 100 for embodying the present invention will now be described.

The digital photographing apparatus 100 includes an optical unit 110, an optical unit driver 111, an image pickup unit 115, an image pickup unit controller 116, a manipulator 120, a program storage unit 130, a buffer storage unit 140, a data storage unit 150, a display unit 160, and a digital signal processor (DSP) 170.

The optical unit 110 provides an optical signal received from a subject to the image pickup unit 115. The optical unit 110 may include at least one lens, such as a zoom lens that narrows or widens a view angle by adjusting a focal length, and a focus lens adjusting focus on the subject. Also, the optical unit 110 may further include an iris adjusting light intensity.

The optical unit driver 111 adjusts the position of a lens, opening and closing of the iris, etc. The focus on the subject may be adjusted by moving the location of the lens. Also, the light intensity may be adjusted by opening and closing the iris. The optical unit driver 111 may control the optical unit 110 according to a control signal automatically generated by an image signal received in real time or a control signal manually received by manipulation of a user.

An optical signal that enters the optical unit 110 forms an image of the subject on a light receiving surface of the image pickup unit 115. The image pickup unit 115 may be a charge coupled device (CCD) or a complementary metal oxide semiconductor image sensor (CIS) that converts an optical signal into an electric signal. Sensitivity of the image pickup unit 115 may be adjusted by the image pickup unit controller 116. The image pickup unit controller 116 may control the image pickup unit 115 according to a control signal automatically generated by an image signal received in real time or a control signal manually received by manipulation of a user.

The manipulator 120 may receive a control signal externally, such as from a user. The manipulator 120 includes various function buttons: a shutter-release button, which receives a shutter-release signal for capturing an image by exposing the image pickup unit 115 to light for a predetermined time; a power supply button, which is pressed to power on or off the digital photographing apparatus 100; a wide angle-zoom button and a telescopic-zoom button, which widens or narrows, respectively, a view angle according to an input; and various other function buttons for selecting a mode, such as a character input mode, a photographing mode, or a reproducing mode, for selecting a white balance setting function, and for selecting an exposure setting function. As described above, the manipulator 120 may include various buttons, but is not limited thereto. The manipulator 120 may receive an input from the user, such as a keyboard, a touch pad, a touch screen, or a remote controller.

The digital photographing apparatus 100 includes the program storage unit 130, which stores programs such as an operating system and an application system for operating the digital photographing apparatus 100, the buffer storage unit 140, which temporarily stores data required to operate the digital photographing apparatus 100 or result data, and the data storage unit 150, which stores various pieces of information required for programs and image files including image signals.

Moreover, the digital photographing apparatus 100 includes the display controller 160, which displays an operating status or information about an image captured by the digital photographing apparatus 100. The display unit 160 may provide visual information and/or auditory information for the user. In order to provide visual information for the user, the display unit 160 may be a liquid crystal display panel (LCD), an organic light emitting display panel (OLED), or an electrophoresis display panel (EPD).

The digital photographing apparatus 100 also includes the DSP 170, which processes a received image signal and controls each element of the digital photographing apparatus 100 according to the received image signal or an external input signal.

Figure 2:
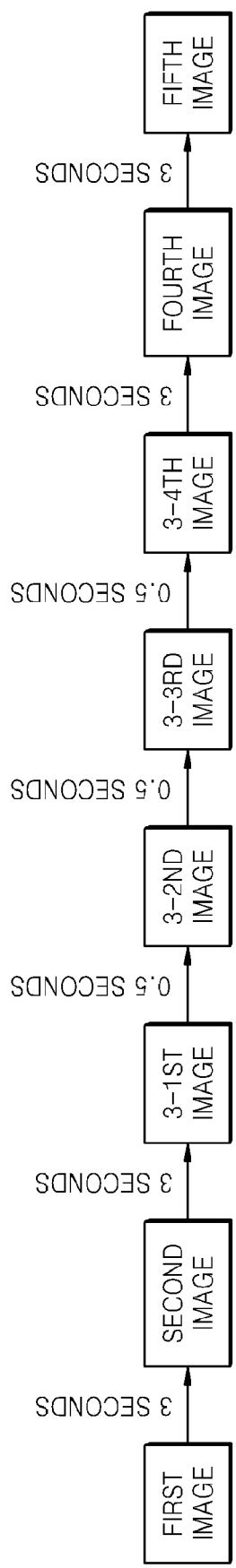
FIG. 2 is a block sequence diagram for describing a slide show according to an embodiment of the present invention.

FIG. 2 is a block sequence diagram for describing a slide show according to an embodiment of the present invention.

When a plurality of images photographed in a general photographing mode or a continuous photographing mode are provided via a slide show, display time of images photographed in the general photographing mode and display time of images photographed in the continuous photographing mode are different from each other. Here, the general photographing mode is a photographing mode wherein one image is photographed when a user presses a shutter-release button once, and the continuous photographing mode is a photographing mode wherein a plurality of images are photographed at predetermined time intervals when the user presses the shutter-release button once.

Referring to FIG. 2, first, second, fourth, and fifth images are images photographed in the general photographing mode, and 3-1st, 3-2nd, 3-3rd, and 3-4th images are images photographed in the continuous photographing mode. In the current embodiment, the images photographed in the general photographing mode are displayed for a second time interval and the images photographed in the continuous photographing mode are displayed for a first time interval. In FIG. 2, the second time interval is 3 seconds, and the first time interval is 0.5 seconds. Accordingly in the method of and apparatus for providing a slide show and the computer readable storage medium having recorded thereon a program for providing a slide show according to various embodiments of the present invention, the first and second images photographed in the general photographing mode are each displayed for 3 seconds, the 3-1st, 3-2nd, and 3-3rd images photographed in the continuous photographing mode are each displayed for 0.5 seconds, and images after the 3-4th image, that is, the last image photographed in the continuous photographing mode are each displayed for 3 seconds. Here, displaying the last image photographed in the continuous photographing mode, i.e., the 3-4th image, for the second time interval is only an embodiment of the present invention, and the last image may be displayed for the first time interval according to another embodiment.

Figure 3:
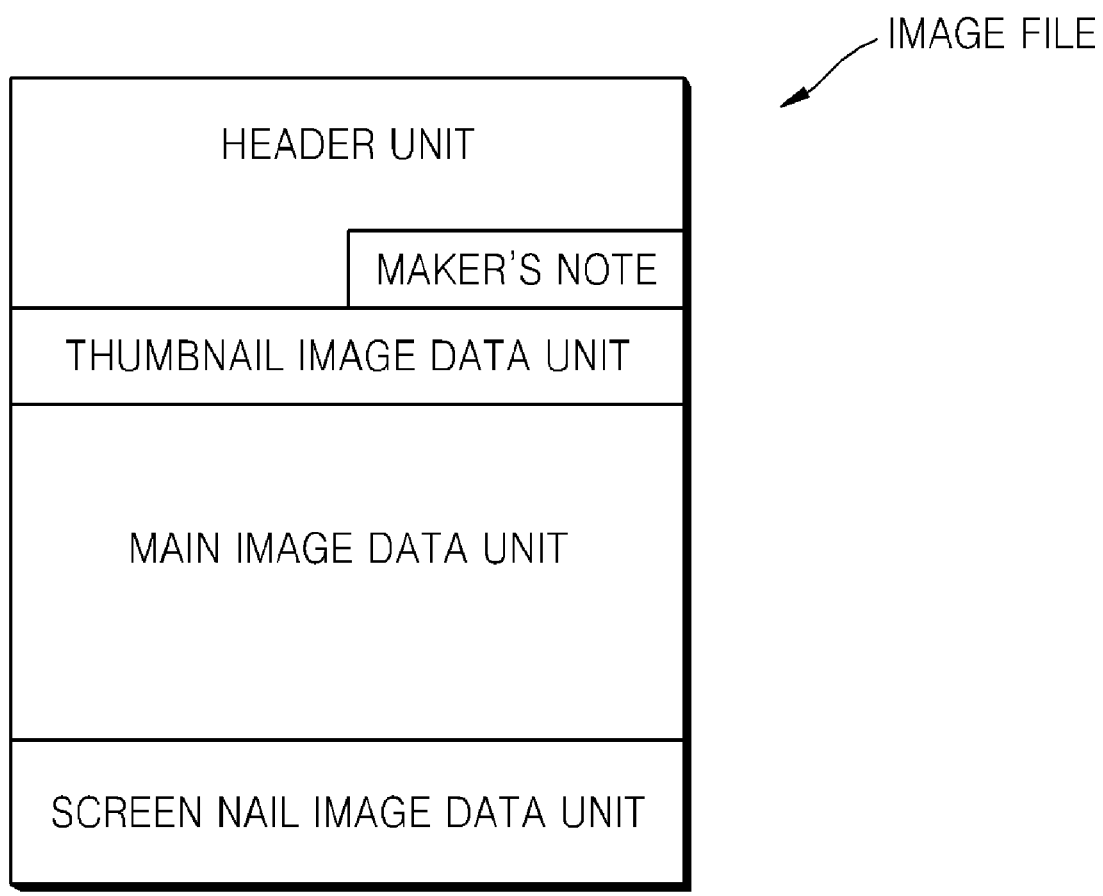
FIG. 3 is a block structure diagram illustrating a structure of an exemplary image file that may be used in an embodiment the present invention.

FIG. 3 is a diagram illustrating a structure of an exemplary image file that may be used in the present invention.

Referring to FIG. 3, the image file includes a header unit, a thumbnail image data unit, a main image data unit, and a screen nail image data unit. Here, a structure of the image file is not limited to the structure illustrated in FIG. 3, and may vary.

The main image data unit contains image data.

The header unit contains data about a maker of the apparatus that processed the image data, a model name of the apparatus, a photographing time, a shutter speed, an iris value, zoom magnification, etc.

The thumbnail image data unit contains thumbnail image data. A thumbnail image is a reduced image of the image data stored in the main image data unit, in order to show a user each image in a reduced form while the user searches for an image file.

The screen nail image data unit contains image data that may be used to display an image by reproducing an image file corresponding to the image. When the image file is displayed in a portable apparatus, such as the digital photographing apparatus 100 of FIG. 1, a physical size of the display unit 160 included in the digital photographing apparatus 100 is generally small, and thus the image data stored in the main image data unit is not displayed on the display unit 160 at the resolution of original image data. Specifically, the resolution of original image data is generally larger than the optimum resolution that the display unit 160 is capable of displaying, and thus when original image data stored in the main image data unit is used to display the image file on the display unit 160, time to process the original image data is increased and quality of the image displayed on the display unit 160 is decreased. Accordingly, data having a small size that is required while displaying the image file on the display unit 160 is prepared separately in the image file. Such data is the data stored in the screen nail image data unit. The screen nail image data unit generally stores image data at a resolution of 640×480, but the size may vary.

The header unit may also contain a maker's note. The maker's note is a space for recording anything that the maker using the image file wants to record.

An image file used in the method, apparatus, and the computer readable storage medium of the present invention may include photographing mode information indicating whether the image file is photographed in a continuous photographing mode in the header unit. In the method, apparatus, and the computer readable storage medium, it is determined whether each image file is photographed in a continuous photographing mode by using the photographing mode information included in the header unit.

Figure 4:
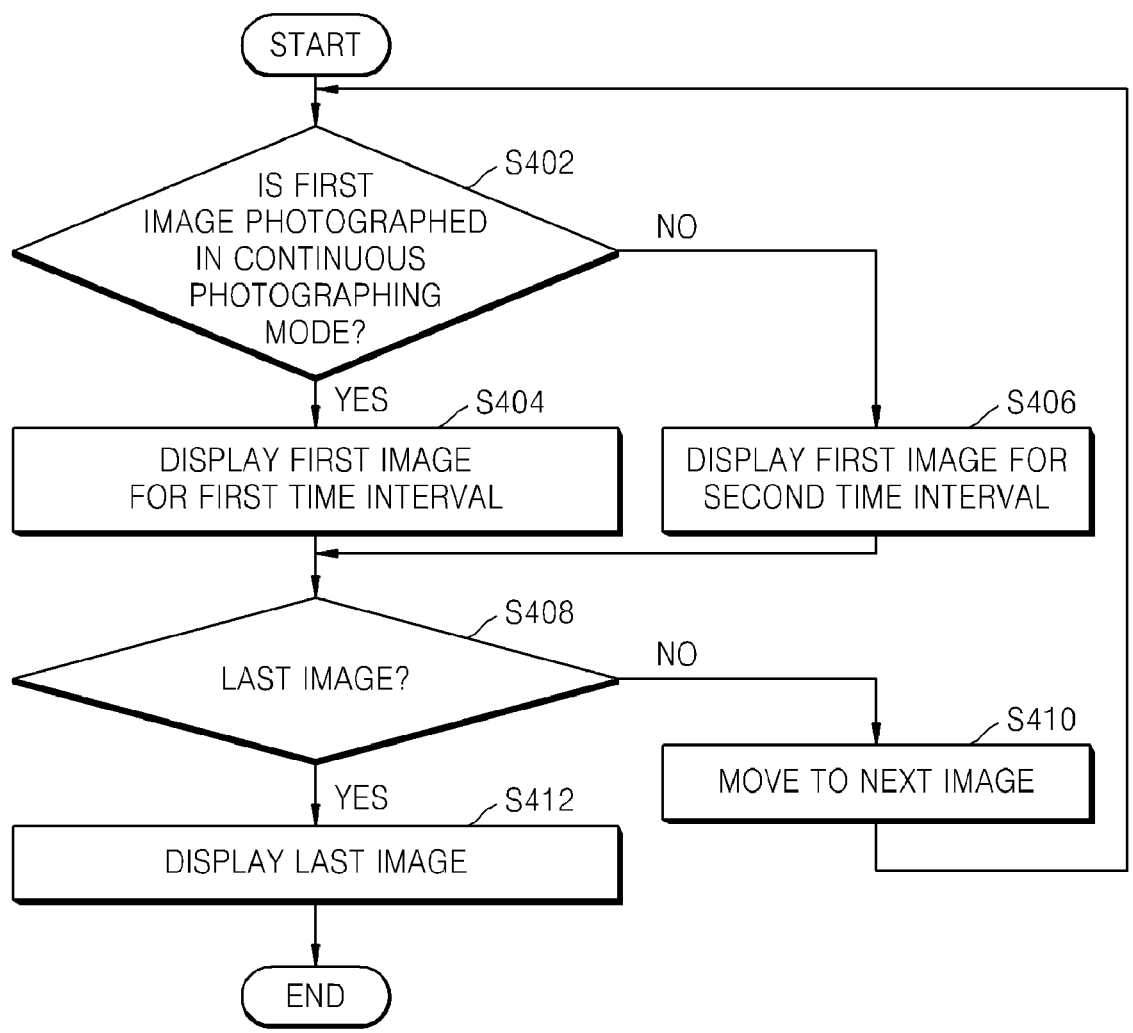
FIG. 4 is a flowchart illustrating a method of providing a slide show, according to an embodiment of the present invention.

FIG. 4 is a flowchart illustrating a method of providing a slide show, according to an embodiment of the present invention.

The method according to the current embodiment displays a first image for a first time interval when the first image is an image photographed in a continuous photographing mode, and displays the first image for a second time interval when the first image is not an image photographed in the continuous photographing mode, i.e., an image photographed in a general photographing mode.

Accordingly, it is determined whether the first image, i.e., an image to be displayed next in a slide show is an image photographed in the continuous photographing mode in operation S402. Whether the first image is an image photographed in the continuous photographing mode may be determined based on photographing mode information included in the header unit of the image file.

When the first image is an image photographed in the continuous photographing mode, the first image is displayed for the first time interval in operation S404 during the slide show. When the first image is not an image photographed in the continuous photographing mode, i.e., when the first image is an image photographed in the general photographing mode, the first image is displayed for the second time interval during the slide show in operation S406. Here, the first time interval is different from the second time interval, and preferably, the first time interval is shorter than the second time interval.

After displaying the first image in the first or second time interval, it is determined whether a following image to be displayed after the first image is the last image to be displayed in the slide show in operation S408. Whether the following image is the last image to be displayed in the slide show is determined based on a range of images used in the slide show, which is determined when the slide show starts. Alternatively, when the slide show is set to repeatedly display images in a predetermined range, such as in a folder, whether the following image is the last image to be displayed in the slide show is determined based on a user input, completing the slide show.

When it is determined that the following image is not the last image to be displayed in the slide show in operation S408, the method moves to an image to be displayed after the following image in operation S410, and operations S402 through S408 are performed. Images to be displayed next are determined based on a predetermined order of the slide show. For example, when the slide show is progressed in an arranged order of file names of image files stored in a predetermined range, for example, in a folder, the following image is an image file after the first image from among the image files included in the predetermined range arranged according to file names.

When it is determined that the following image is the last image to be displayed in the slide show in operation S408, the last image is displayed in operation S412 and the method ends.

Figure 5:
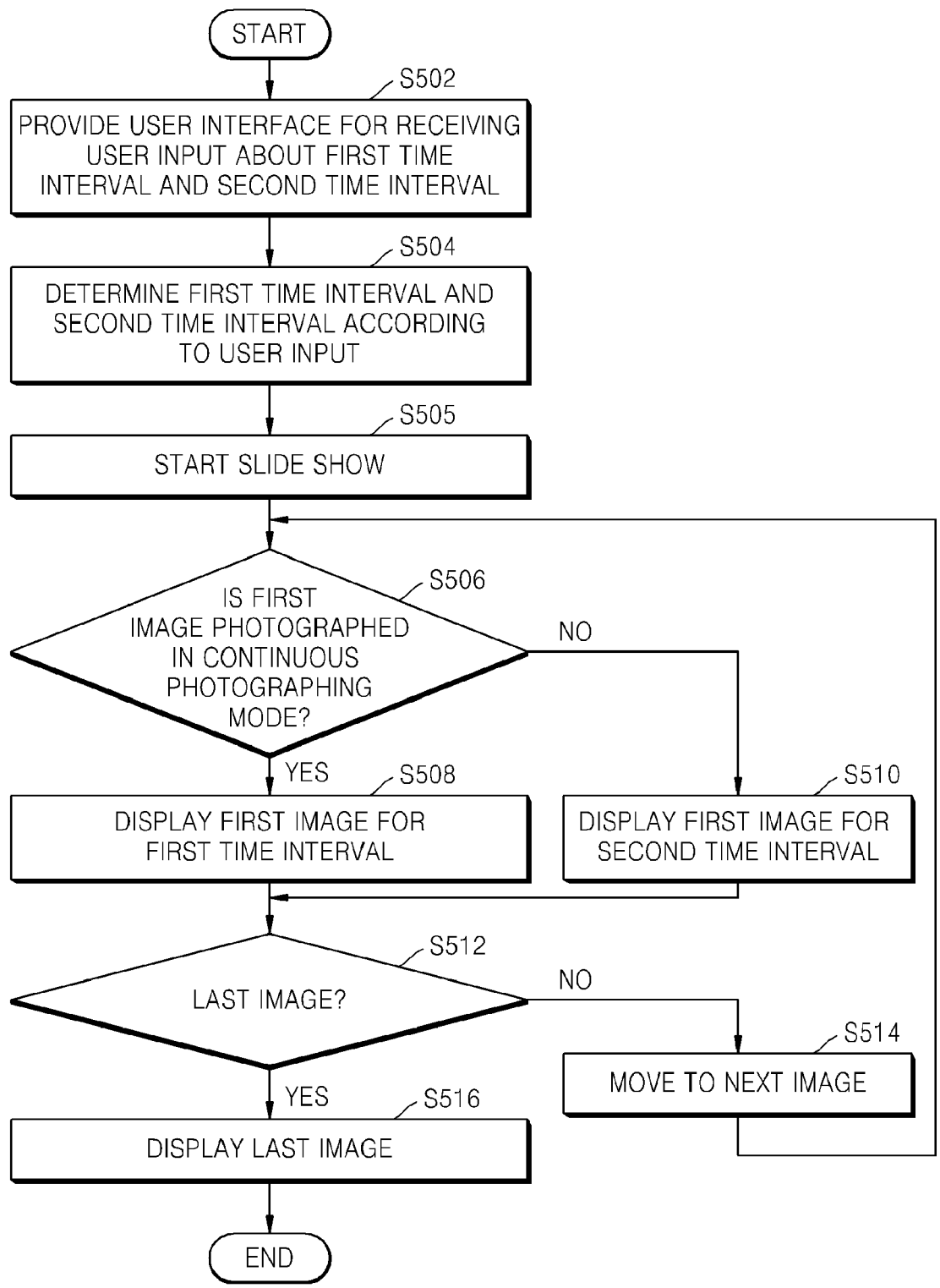
FIG. 5 is a flowchart illustrating a method of providing a slide show, according to another embodiment of the present invention.

FIG. 5 is a flowchart illustrating a method of providing a slide show, according to another embodiment of the present invention.

According to the current embodiment, a first time interval and a second time interval are determined by a user input.

In the method according to the current embodiment, a user interface for receiving a user input to input the first and second time intervals is provided before starting a slide show in operation S502. The user interface is provided via the display unit 160 of FIG. 1 so that a user is able to input the first and second time intervals. The user may input the first and second time intervals by using the manipulator 120 of FIG. 1.

When the first and second time intervals are input via the user interface, the first and second time intervals are determined based on the user input in operation S504. In the current embodiment, time for displaying images during the slide show is freely determined by the user in this operation.

When the first and second time intervals are determined, the slide show starts automatically or in response to a user input in operation S505.

Operations S506, S508, S510, S512, S514, and S516 are identical to operations S402, S404, S406, S408, S410, and S412 of FIG. 4, respectively, and thus descriptions thereof are omitted herein.

Figure 6:
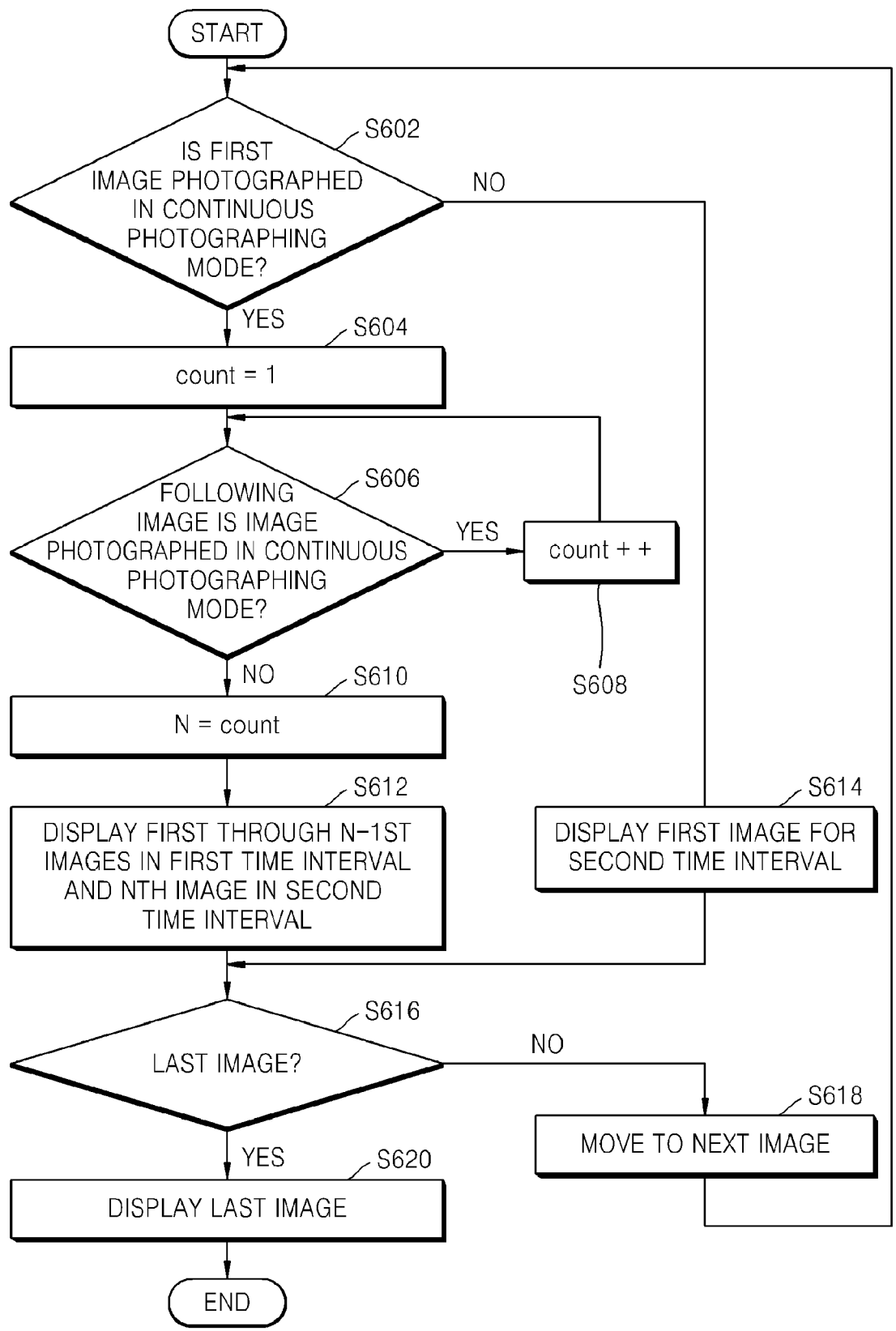
FIG. 6 is a flowchart illustrating a method of providing a slide show, according to still another embodiment of the present invention.

FIG. 6 is a flowchart illustrating a method of providing a slide show, according to still another embodiment of the present invention.

In the method according to the current embodiment, when a first image to be displayed in a slide show is an image photographed in the continuous photographing mode, it is determined whether images to be displayed sequentially after the first image are images photographed in the continuous photographing mode, a number of continuous images N indicating a number of images photographed in the continuous photographing mode is counted, and the first image through an (N−1)th images are displayed in a first time interval.

According to the method, it is determined whether the first image is an image photographed in the continuous photographing mode in operation S602.

When it is determined that the first image is an image photographed in the continuous photographing mode, a value of a first count for counting a number of images photographed in the continuous photographing mode is set as an initial value in operation S604, and then it is determined whether a following image is an image photographed in the continuous photographing image in operation S606. The first count is increased in each iteration of operation S608 until an image that is not photographed in the continuous photographing mode is found. When the image that is not photographed in the continuous photographing mode is found while repeating operations S606 and S608, the number N is set as the first count in operation S610. Operations S604, S608, and S610 will be described with reference to FIG. 7.

Figure 7:
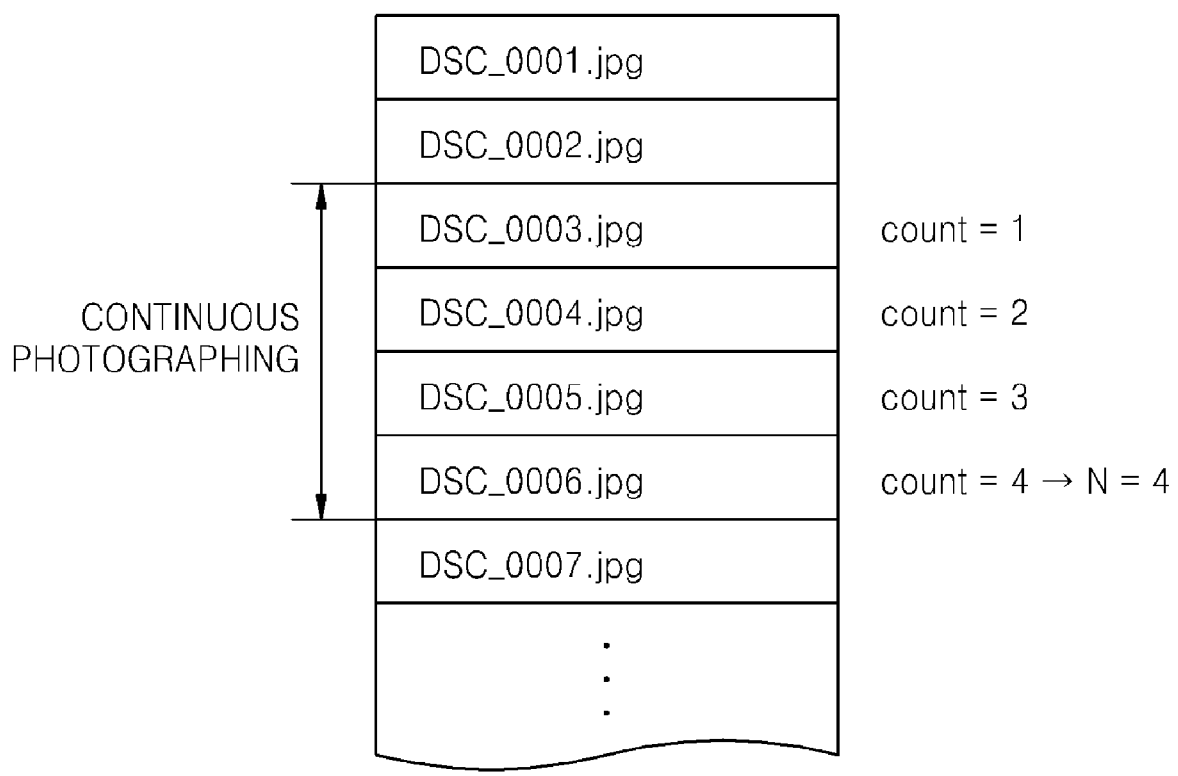
FIG. 7 is a block structure diagram illustrating a file system in which a plurality of image files are stored.

FIG. 7 is a diagram illustrating a file system in which a plurality of image files DSC_0001.jpg through DSC_0007.jpg are stored. Here, it is assumed that DSC_0003.jpg, DSC_0004.jpg, DSC_0005.jpg, and DSC_0006.jpg are images photographed in a continuous photographing mode. Referring back to the method of FIG. 6, the slide show is performed while determining whether images are photographed in the continuous photographing mode sequentially from the first image, for example, DSC_0001.jpg, in operation S602. When DSC_0003.jpg is to be displayed after displaying DSC_0002.jpg, it is determined that DSC_0003.jpg is an image photographed in the continuous photographing mode, and the value of the first count is set to the initial value, for example, 1. Then, it is determined sequentially that DSC_0004.jpg, DSC_0005.jpg, and DSC_0006.jpg, which are to be displayed after DSC_0003.jpg, are images photographed in the continuous photographing mode. Since DSC_0004.jpg, DSC_0005.jpg, and DSC_0006.jpg are images photographed in the continuous photographing mode, operations S606 and S608 are repeated, thereby increasing the value of the first count in each iteration. When operation S606, i.e., determining whether the following image is an image photographed in the continuous photographing mode, is performed on DSC_0007.jpg, the value N is set to be the current value of the first count, since DSC_0007.jpg is not an image photographed in the continuous photographing mode. In FIG. 7, the number of images photographed in the continuous photographing mode is 4, and the value of the first count is 4 when operation S606 is performed when the image is DSC_0007.jpg. Accordingly, the number N is set to be 4.

Referring back to FIG. 6, when the number N is determined in operation S610, the first image (DSC_0003.jpg in FIG. 7) through the (N−1)th image (DSC_0005.jpg in FIG. 7) are each displayed for the first time interval during the slide show, and the Nth image (DSC_0006.jpg in FIG. 7), which is the last image photographed in the continuous photographing mode is displayed for the second time interval during the slide show, in operation S612.

When it is determined that the first image is not an image photographed in the continuous photographing mode in operation S602, the first image is displayed for the second time interval in operation S614.

Operations S616, S618, and S620 are identical to operations S408, S410, and S412 of FIG. 4, respectively, and thus descriptions thereof are omitted herein.

Figure 8:
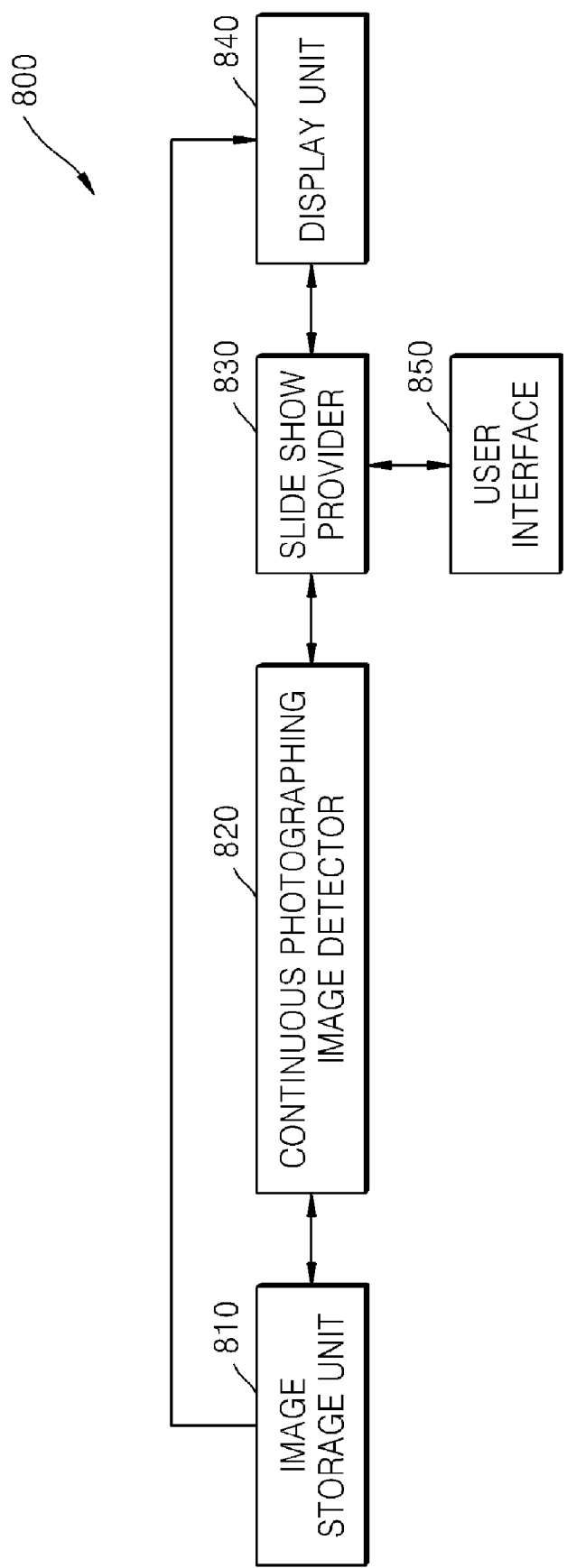
FIG. 8 is a block diagram of an apparatus for providing a slide show, according to an embodiment of the present invention.

FIG. 8 is a block diagram of an apparatus 800 for providing a slide show, according to an embodiment of the present invention.

The apparatus 800 according to the current embodiment may include an image storage unit 810, a continuous photographing image detector 820, a slide show provider 830, and a display unit 840.

The image storage unit 810 stores a plurality of images to be displayed during a slide show. The image storage unit 810 may be realized via the data storage unit 150 of FIG. 1.

The display unit 840 displays images provided during the slide show. The display unit 840 may be realized via the display unit 160 of FIG. 1.

The continuous photographing image detector 820 determines whether a first image to be displayed during the slide show is an image photographed in a continuous photographing mode. Whether the first image is an image photographed in the continuous photographing mode is determined from photographing mode information contained in a header unit of the image file of the first image.

When the first image is an image photographed in the continuous photographing mode, the slide show provider 830 controls the display unit 840 to display the first image for a first time interval, and when the first image is not an image photographed in the continuous photographing mode, the slide show provider 830 controls the display unit 840 to display the first image for a second time interval. The slide show provider 830 may control the display unit 840 by providing, for example, a file path of the first image and information about time (the first time interval or second time interval) for displaying the first image to the display unit 840.

When the first image is an image photographed in the continuous photographing mode, the slide show provider 830 determines whether images to be displayed after the first image are photographed in the continuous photographing mode until an image that is not photographed in the continuous photographing mode is detected, and obtains a number of continuous images N by counting a number of images photographed in the continuous photographing mode. A process of obtaining the number N has been described above with reference to FIG. 7. When the first image is an image photographed in the continuous photographing mode, the slide show provider 830 controls the display unit 840 to display the first image through (N−1)th image for the first time interval and to display the Nth image for the second time interval.

The continuous photographing image detector 820 and the slide show provider 830 may be realized via the program storage unit 130 of FIG. 1 for storing computer codes programmed to perform operations of the continuous photographing image detector 820 and the slide show provider 830, and the DSP 170 of FIG. 1 for executing the computer codes.

The apparatus 800 further includes a user interface 850. The first and second time intervals may be determined according to a user input. Accordingly, the apparatus 800 includes the user interface 850 for receiving the user input to input the first and second time intervals. The user interface 850 may be realized via the program storage unit 130 of FIG. 1 for storing computer codes programmed to provide the user interface 850, the DSP 170 of FIG. 1 for executing the computer codes, the display unit 160 of FIG. 1 for displaying a screen of the user interface 850, and the manipulator 120 of FIG. 1 for receiving a user input. The slide show provider 830 may determine the first and second time intervals according to a user input received from the user interface 850.

Accordingly, a time interval for displaying a plurality of images photographed in a continuous photographing mode is set differently from a time interval of displaying images photographed in a general photographing mode during a slide show, and thus a vivid slide show can be provided.

The invention can also be embodied as computer readable codes on a computer readable storage medium. The computer readable storage medium is any data storage device that can store data that can be thereafter read by a computer system.

The computer readable codes are configured to execute the method of providing a slide show according to the present invention, when the computer readable codes are read and executed by the DSP 170 of FIG. 1 from the computer readable storage medium. The computer readable codes may be realized in various programming languages. Also, functional programs, codes, and code segments for accomplishing the present invention can be easily construed by programmers skilled in the art to which the present invention pertains.

Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A method of providing a slide show for displaying a plurality of images including at least one image photographed in continuous photographing mode and at least one image not photographed in the continuous photographing mode, the method comprising:
    determining whether a first image to be displayed is an image photographed in a continuous photographing mode;
    displaying the first image for a first display time, when the first image is an image photographed in the continuous photographing mode; and
    displaying the first image for a second display time, when the first image is not an image photographed in the continuous photographing mode,
wherein:
    the first display time and the second display time are different from each other; and
    when the first image is an image photographed in the continuous photographing mode, the displaying comprises:
        determining whether images to be displayed after the first image are images photographed in the continuous photographing mode until an image that is not photographed in the continuous photographing mode is detected, and counting a number of continuous images N by counting the number of images photographed in the continuous photographing mode; and
        displaying the first image through an (N−1)th image for the first display time, and displaying an Nth image for the second display time.

2. The method of claim 1, wherein the first display time is shorter than the second display time.

3. The method of claim 1, further comprising:
    providing a user interface capable of receiving a user input regarding the first and second display times; and
    determining the first and second display times according to a user input received from the user interface.

4. An apparatus for providing a slide show, the apparatus comprising:
    an image storage unit for storing a plurality of images;
    a display unit for displaying an image;
    a continuous photographing image detector for determining whether a first image to be displayed is an image photographed in a continuous photographing mode; and
    a slide show provider for providing a slide show for the plurality of images including at least one image photographed in continuous photographing mode and at least one image not photographed in the continuous photographing mode, and controlling the display unit to display the first image for a first display time when the first image is an image photographed in the continuous photographing mode, and to display the first image for a second display time when the first image is not an image photographed in the continuous photographing mode,
wherein:
    the first display time and the second display time are different from each other;
    the continuous photographing image detector determines whether images to be displayed after the first image are images photographed in the continuous photographing mode until an image that is not photographed in the coninuous photographing mode is detected, and counts a number of continuous images N by counting the number of images photographed in the continuous photographing mode, and
    the slide show provider controls the display unit to display the first image through an (N−1)th image for the first display time, and display an Nth image for the second display time, when the first image is an image photographed in the continuous photographing mode.

5. The apparatus of claim 4, wherein the first display time is shorter than the second display time.

6. The apparatus of claim 4, further comprising:
    a user interface capable of receiving a user input regarding the first and second display times, wherein
    the slide show provider determines the first and second display times according to a user input received from the user interface.

7. The apparatus of claim 4, wherein the apparatus is a digital photographing apparatus.

8. A computer readable storage medium having recorded thereon a computer program executable on a processor for providing a slide show displaying a plurality of images including at least one image photographed in continuous photographing mode and at least one image not photographed in the continuous photographing mode, the computer program comprising:
    a code portion programmed to determine whether a first image to be displayed is an image photographed in a continuous photographing mode;
    a code portion programmed to display the first image for a first display time when the first image is an image photographed in the continuous photographing mode; and
    a code portion programmed to display the first image for a second display time when the first image is not an image photographed in the continuous photographing mode,
wherein:
    the first display time and the second display time are different from each other; and
    the code portion programmed to display the first image for the first display time when the first image is an image photographed in the continuous photographing mode comprises:
        a code portion programmed to determine whether images to be displayed after the first image are images photographed in the continuous photographing mode until an image that is not photographed in the continuous photographing mode is detected, and count a number of continuous images N by counting the number of images photographed in the continuous photographing mode; and
        a code portion programmed to display the first image through an (N−1)th image for the first time interval, and to display an Nth image for the second display time.

9. The computer readable storage medium of claim 8, wherein the first display time is shorter than the second display time.

10. The computer readable storage medium of claim 8, wherein the computer program further comprises:
    a code portion programmed to provide a user interface capable of receiving a user input regarding the first and second display times; and
    a code portion programmed to determine the first and second display times according to a user input received from the user interface.

* * * * *